United States Patent [19]
Elliott

[11] 3,926,071
[45] Dec. 16, 1975

[54] CONTROL DEVICE

[75] Inventor: Eugene R. Elliott, Libertyville, Ill.

[73] Assignee: Culligan International Company, Northbrook, Ill.

[22] Filed: Nov. 4, 1974

[21] Appl. No.: 520,468

[52] U.S. Cl. .................... 74/567; 74/435; 74/436; 235/104
[51] Int. Cl.² .................... F16H 53/00; F16H 55/04; G06M 3/00
[58] Field of Search ...... 235/104; 74/435, 436, 567, 74/479

[56] References Cited
UNITED STATES PATENTS
3,077,300  12/1963  Fried et al. .................... 235/104 X
3,805,154   4/1974  Halstead et al. ................. 74/436 X

*Primary Examiner*—Leonard H. Gerin
*Attorney, Agent, or Firm*—Hill, Gross, Simpson, Van Santen, Steadman, Chiara & Simpson

[57]  ABSTRACT

A device for controlling actuation of valves of a liquid treatment apparatus such as a filter or a water conditioning apparatus during the reconditioning operation such as washing the filter apparatus or regenerating the water conditioning apparatus characterized by a compound cam unit having at least two cam surfaces formed by a center member and a segment member which may be relatively rotated and adjusted to simultaneously adjust the length of the two cam surfaces. To rotate the cam unit, a motor drives a pinion which is yieldingly mounted for engagement with a driven gear of the cam unit which driven gear has a cut-out segment for receiving the pinion when the cam unit is in a neutral or service position. To shift the cam unit from the service position into an operating position, the device includes a shifting means which may be a pivoting lever operated by a calendar device or a solenoid engaging a groove on the cam unit when actuated by a sensed signal.

27 Claims, 17 Drawing Figures

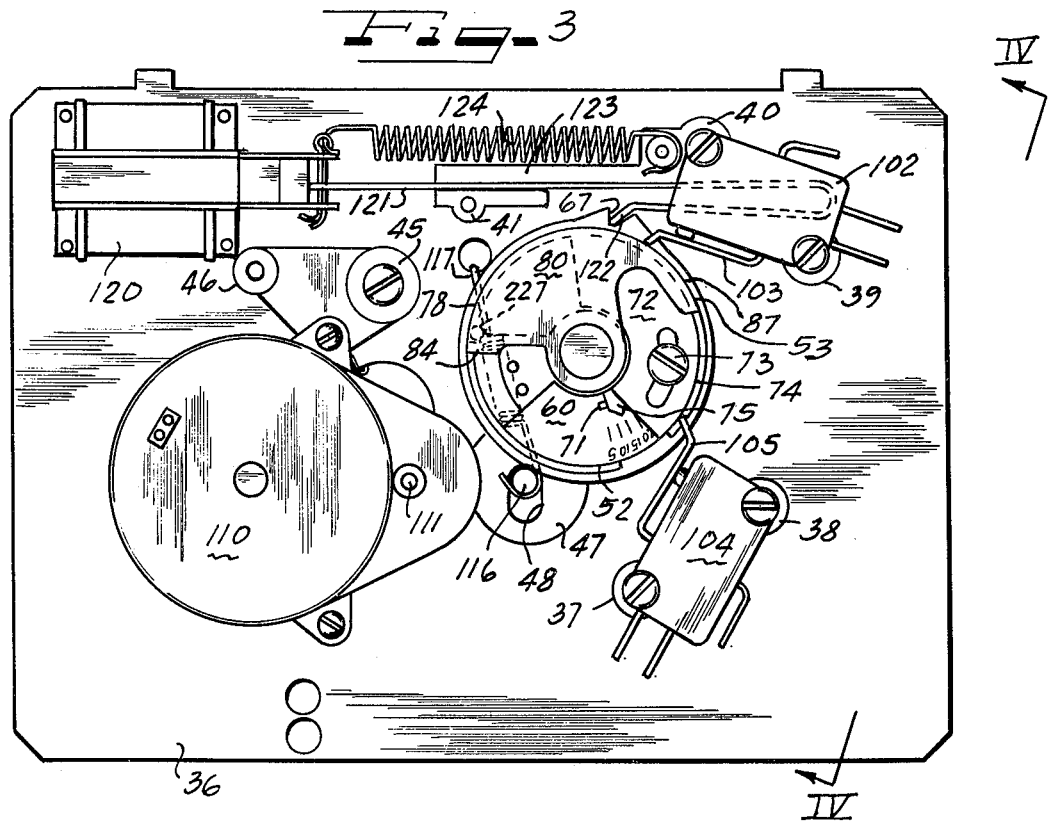
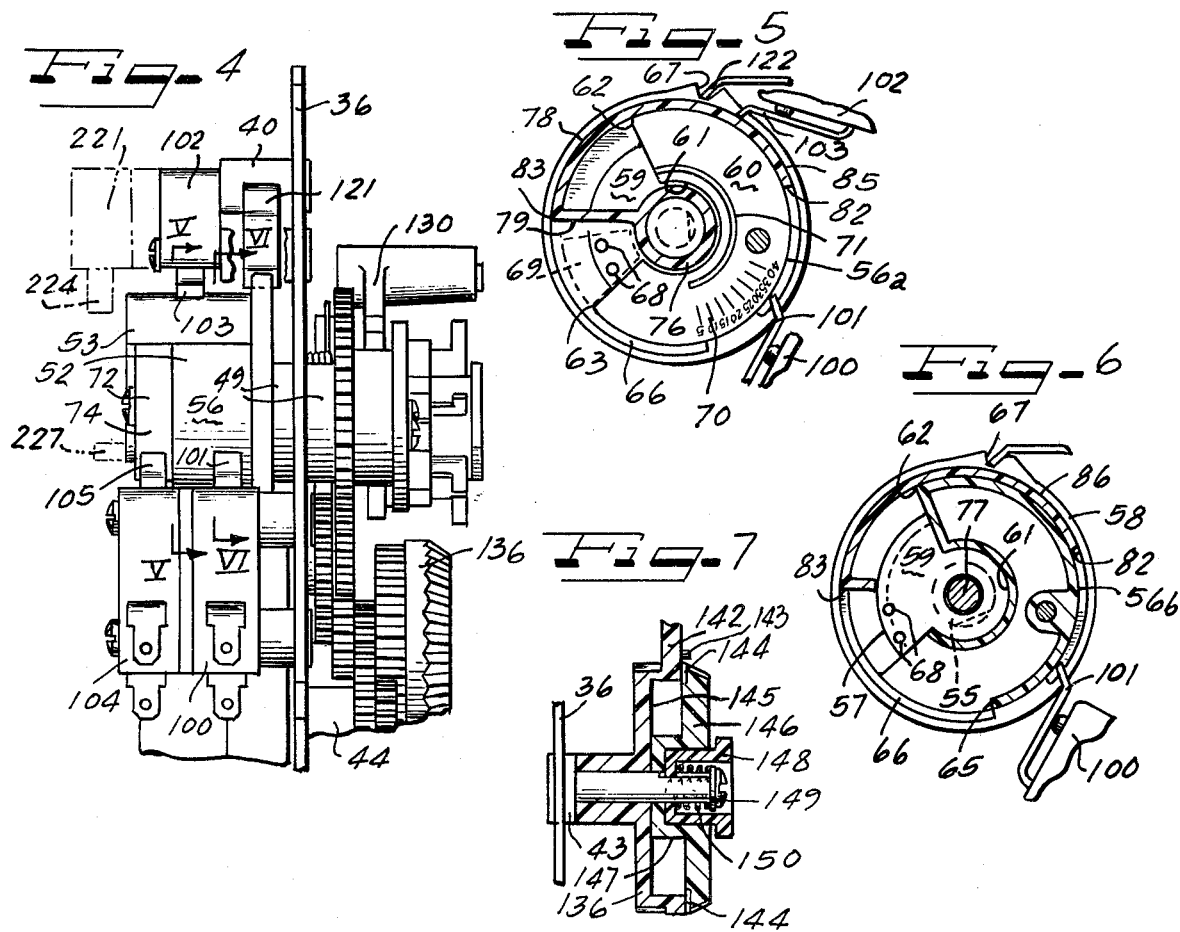

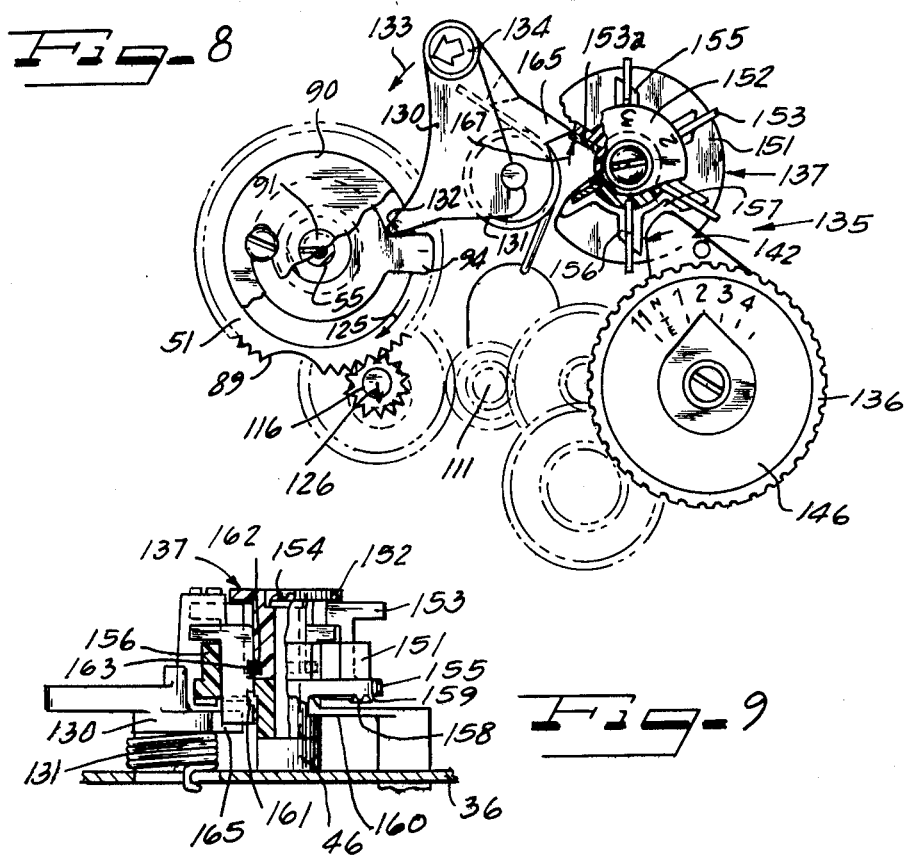
Fig-8
Fig-9
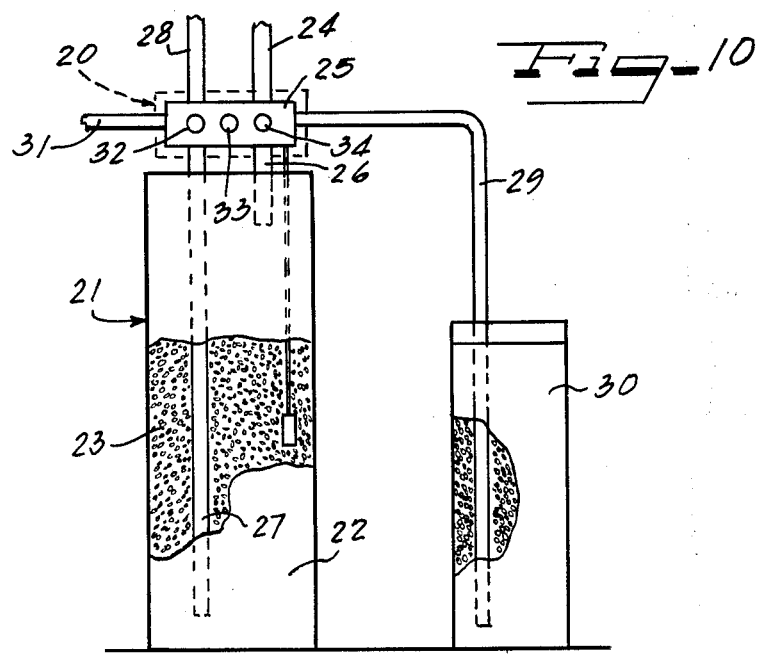
Fig-10

CONTROL DEVICE

BACKGROUND OF THE INVENTION

1. Field of the Invention

The present invention relates to a control device for controlling reconditioning of a liquid treatment system, in particular regeneration of a water conditioning or softening apparatus.

2. Prior Art

A liquid treatment apparatus or device, such as a water conditioning apparatus, requires periodic regeneration of the resin bed which treats the water by removing various minerals therefrom to produce a soft water. Originally, the conditioning apparatus was manually regenerated by shutting the unit down, passing a brine solution through the bed to regenerate the resin bed and then flushing the bed to remove any traces of the brine solution prior to placing the device back into service. In some apparatuses, a backwash of the bed is desirable for removing sediment which has been separated from the water during the conditioning operation and which sediment may interfere with the regeneration operation.

Instead of manually initiating the regeneration cycle, various control devices have been proposed for initiating a regenerating operation at a given interval of time such as twice a day, once a day, once every 2 days, or once every 4 days. Each of these systems utilizes a calendar or timing device which can be set to initiate the operation at a given time of day by starting rotation of a set of cams which cams during rotation sequentially control valves of a valve unit to perform the various steps of regeneration. Two examples of timers that may be utilized to control regeneration are disclosed in U.S. Pat. No. 3,053,268 which issued on Sept. 11, 1972 to Schulze et al. and U.S. Pat. No. 3,302,467 which issued on Feb. 7, 1967 to Prosser.

Instead of utilizing a calendar device to initiate regeneration at a fixed interval of time, it has been suggested to initiate the regeneration in response to a second condition of the resin bed. One example of this device is disclosed in U.S. Pat. No. 3,373,351 which issued on May 12, 1968 to Rak and discloses a probe which indicates changes in the resistance of the ion exchange material of the resin bed of the water conditioner to produce a signal which starts a control device which controls regeneration of the conditioning apparatus.

In addition to water softening or water conditioning device whose regeneration is controlled by a sensed condition certain installations of the conditioning apparatus such as for commercial laundries require a constant source of soft water and uses a duplex system. In a duplex system, a pair of water softening or water conditioning apparatuses are used with each of the apparatuses having a separate control unit which units are interconnected with an interlocking device to prevent both units from being in a regenerating condition at the same time. An example of this type of system is disclosed in U.S. Pat. No. 3,675,041 which issued on July 4, 1972 to Elliott et al. and this patent discloses a control unit which can be operated by a sensing probe or through a calendar device.

In any of the above described systems, which are either a "two cycle system" having a brine rinse and flush followed by a filling of the brine tank to produce the brine for the following operation or the "five cycle system" which involves a backwash, a brine rinse, a slow flush, a fast flush and a refilling of the brine tank, the length of each of the steps such as backwash, brine rinse, or time for filling of the brine tank to produce new brine varies upon the particular condition of the water being treated. For example, as the amount of the brine solution required for regeneration increases, the time of rinsing to remove traces of salt after regeneration increases. Also, with an increase in the amount of brine necessary for regeneration, the amount of water for refilling of the brine tank will increase. Thus, adjusting the length of time of one step in the reconditioning operation requires similar changes in the length of time of the other steps for proper operation of the regeneration cycle. In a known system, the various cams for use in controlling the length of the steps were individually adjusted and often required entry into the control unit so that any required adjustments had to be done by a service personnel, and could not be accomplished by users of the device.

SUMMARY OF THE INVENTION

The present invention is directed to a control device for controlling reconditioning of a liquid treatment apparatus which device enables easy and simultaneous adjustment of the lengths of the cam surfaces for the various changes in the condition of the liquid. To accomplish these tasks, the device utilizes a compound cam unit mounted on a support for rotation and including a driven gear having cut-out segment in its periphery, a center member attached to the driven gear to rotate therewith, a segment member, and means for adjustably interconnecting the segment member and the center member. The members have partial cylindrical surfaces with at least one of the partial cylindrical surfaces having axially spaced portions at different arcuate lengths and are interconnected by the interconnecting means with the cylindrical surfaces of the segment member in overlapping relation with a portion of the cylindrical surface of the center member to coact to form at least a first and second cylindrical cam surface which are axially spaced and have different arcuate lengths. The device includes first and second means for controlling actuation of the valves which means are preferably switch means which control solenoid actuated valves and have cam followers which engage the respective cam surfaces when the unit is in the service position. A motor mounted on the support drives a pinion which is mounted by mounting means at the cut-out segment of the driven gear when the cam unit assumes a service position and the mounting means enables yielding of the pinion gear relative to the driven gear to enable mesh engagement therewith as the driven gear is rotated from the service position. To initiate rotation of the cam unit, means are engageable with the cam unit when in service position for rotating the cam unit from the service position in response to initiating signal which may either be from a calendar device or from a solenoid or a combination thereof.

To enable a five cycle regeneration or a reconditioning operation requiring three cam surfaces, a segment element is adjustably attached on the center member and coacts with an axially spaced portion of the segment member to form a third cam surface which is engaged by a third actuating means or switch means.

To enable adjustment of the lengths of each of the two or three cam surfaces without dismantling the control device, the connecting means between the center member and the segment member extends to the front side of the support.

Preferably, the control unit includes a calendar device which will rotate the cam unit from a service position at a specific time of day, which is adjustable, and at a given interval which may be adjusted to be a daily interval or an interval of more than 1 day. When using the unit with a sensing probe to provide the initiating signal, the calendar unit is preferably provided as a back-up to ensure a regeneration at least once every fixed number of day and to enable switching to a calendar control of regeneration if the automatic probe system malfunctions.

The control device is particularly adapted in a regeneration of a water conditioning or softening apparatus by using both a probe and a calendar device so that regeneration occurs when needed but only at specific times of day.

The unit is also useful in a duplex system which is provided with interlocking means so that as regeneration is being controlled by one device of the pair of devices, the other device of a pair is delayed from starting a regeneration cycle until completion of the cycle by the one device.

BRIEF DESCRIPTION OF THE DRAWINGS

FIG. 3 is a back view of the control device of the present invention;

FIG. 4 is a partial end view taken along lines IV—IV of FIG. 3;

FIG. 5 is a partial cross section taken along lines V—V of FIG. 4;

FIG. 6 is a partial cross section taken along lines VI—VI of FIG. 4;

FIG. 7 is a partial cross section taken along lines VII—VII of FIG. 1;

FIG. 8 is a partial view similar to FIG. 1 with portions broken away and removed for purposes of illustration;

FIG. 9 is a partial cross sectional view taken along lines IX—IX of FIG. 1;

FIG. 10 is a schematic illustration with portions broken away for purposes of illustration of a treatment apparatus for utilizing the control device of the present invention;

DESCRIPTION OF THE PREFERRED EMBODIMENTS

Figure 1:
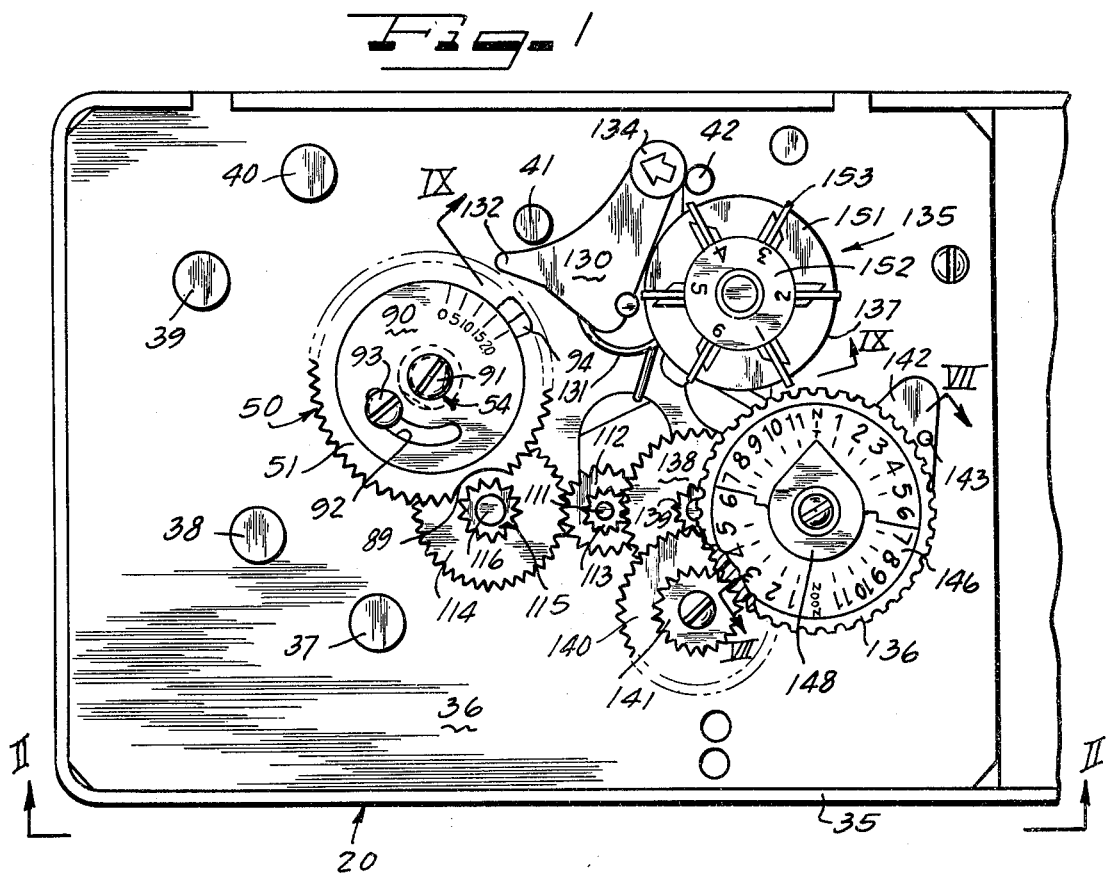
FIG. 1 is a front view with portions broken away for purposes of illustration of a control device of the present invention.

The principles of the present invention are particularly useful in a control device generally indicated at 20 in FIG. 1 and which control device is particularly useful for controlling a reconditioning of a liquid treatment device such as a water conditioning or softening apparatus or device generally indicated at 21 in FIG. 10.

The water conditioning or softening apparatus 21 comprises a tank 22 containing a bed 23 of a suitable ion exchange resin. To introduce water into the tank, a water supply line 24 extends to a valve housing 25 which passes the water through a pipe 26 into the tank 22 and the water passes down through the bed 23 and is removed by a pipe 27 through the valve housing 25 to a line 28 extending to the water system. In addition to the two pipes 26 and 27 extending to the container or tank 22, the housing 25 receives a line or conduit 29 which extends to a brine tank 30 which contains salt for forming the brine and a conduit 31 which extends to a drain.

The control device 20 (broken line) is mounted on valve housing 25 which has a valve member or plurality of valve members which during service condition connects the conduit 24 to the conduit 26 and the conduit 27 to the conduit 28. The control device 20 when initiating a regeneration of the apparatus 21, will control actuation of a plurality of pilot valves such as solenoid actuated valves 32, 33 and 34, whose actuation shifts the valve member or members in housing 25 to by-pass the water inlet 24 to the outlet 28 interconnecting conduit 27 to the drain conduit 31, and interconnects the conduit 29 through an eductor means to the conduit 26.

Figure 2:
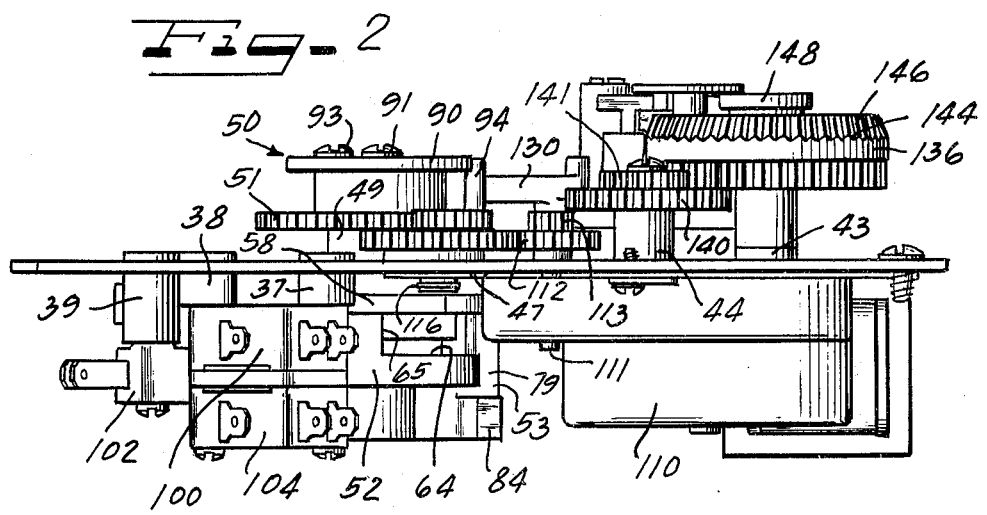
FIG. 2 is a side view taken along lines II—II of FIG. 1 with portions removed for purposes of illustration.

As illustrated in FIG. 1, the control device 20 has a housing 35 which is preferably constructed to be water tight and contains a support 36 which is a substantially flat plate. The support 36 has a plurality of mounting pads 37–41 which extend from a back or rear surface of the plate as best illustrated in FIGS. 2 and 4. The support also has a stop 42 (FIG. 1) and posts 43, 44, 45 and 46 (FIGS. 2 and 3), which extend from the front surface. In addition, the support 36 has a bearing insert 47 (FIG. 3) which has a slotted aperture 48 and a bearing insert 49 which extends from both the front and back surfaces of the plate 36 (FIG. 4).

The control device 20 includes a cam unit 50 which is formed by a driven gear 51, a center member 52, a segment member 53 and means generally indicated at 54 for interconnecting the members and gear together. The center member 52 is a molded plastic part having a hollow, cylindrical shaft 55 and a plurality of flat wall portions and circular wall portions which coact to form an outer partial cylindrical surface 56, an inner partial cylindrical surface 57, a radially extending flange 58, a first flat surface 59, a second axially spaced flat surface 60 and a partial recess 61. The partial recess 61 and the partial cylindrical surfaces 56 and 57 are all concentric with the shaft 55.

The outer partial cylindrical surface 56 extends from an edge 62 to an edge 63 (FIG. 5) and adjacent the flange 58 has a cut-out or removed portion 64 (FIG. 2) to provide an edge 65 (FIG. 6) between the edges 62 and 63. The edge 62 and the edges 63 and 65 of the surface 56 provide the surface 56 with axially spaced positions 56a (FIG. 5) and 56b (FIG. 6) of different arcuate lengths and the portion 56b has the shorter length and is adjacent the flange 58.

The flange 58 extends radially from both the inner surface 57 and the outer surface 56 and has a surface which is substantially in the plane of one of the edges of the cut-out portions 64. Adjacent the partial cylindrical surface 56, the flange 58 is provided with an arcuate groove 66 which is almost a complete circle. The flange 58 has a substantial circular periphery with a radially extending projection with an outwardly opening V-shaped notch 67 and sides of the projection are inclined at an angle to the tangent of the periphery to provide sloping surfaces to the notch.

The first flat surface 59 which extends radially inward from the inner partial cylindrical surface 57 lies in a plane of one of the other edges of the cut-out portion 64. The surface 59 is provided with a pair of apertures 68 which may be used for mounting a segment element 69 (illustrated in broken lines in FIG. 5) to extend the arcuate length of the arcuate portion 56a.

The second flat surface 60 which is axially spaced from the surface 59 extends radially inward from the partial surface 56 to the recess 61. The flat surface 60 is provided with indicia 70 and with guide means, which is illustrated as a concentric arcuate projection 71. The indicia 70 and the guide means 71 are used to adjustably position a segment element 72 (FIG. 3) on the upper surface 60. The segment element 72 has a corresponding arcuate groove for receiving the arcuate projection 71 and is adjustably positioned and mounted on the surface 60 by a threaded fastener 73. The member or segment 72 has a partial cylindrical surface 74 of the same radius as the surface 56 and the guide means 71 ensures that the surface 74 is aligned with the surface 56. The element 72 also includes a pointer 75 which coacts with the indicia to show the relative position of the element 72 when mounted on the surface 60.

The segment member 53 is a molded plastic member and has a hub 76 (FIG. 5) with a cylindrical post 77 (FIG. 6) extending axially therefrom. The member 53 has a partial cylindrical wall forming a partial cylindrical surface 78 which is concentric with the hub 76 and supported on the hub by a radially extending wall 79, which is contoured to the shape of inner surface 57 and surface 59 of member 52, and a flat wall 80. The cylindrical surface 78 terminates at one end at an edge 82 and at the opposite end with an edge 83 which is formed by the junction of wall forming the partial cylindrical surface 78 and the radial wall 79. The wall 79 adjacent the flat surface 80 is provided with a projection or extension 84 (FIGS. 2 and 3) to slightly increase the arcuate length of the arcuate portion of the surface 78 which is immediately adjacent the upper wall 80.

The segment member 53 is assembled on the center member 52 with the post 77 being received in the hollow shaft 55, the hub 76 partially received in the recess 61 and an edge of the wall forming the cylindrical surface 78 being received in the arcuate groove 66. As assembled, a portion of the wall forming the partial cylindrical surface 78 is in overlapping relation with a portion of the outer cylindrical surface 56 of the center member and, as illustrated, overlies that portion to form a pair of cam surfaces 85 (FIG. 5) and 86 (FIG. 6). Cam surface 85 is formed by a coaction of surface portion 56a with an axially aligned portion of the partial cylindrical surface 78 and the cam surface 86 is formed by portion 56b and an axially aligned portion of the partial cylindrical surface 78. In addition thereto, a portion of the partial cylindrical surface 78 which includes the extension formed by the projection 84 coacts with the partial cylindrical surface 74 of the segment element 72 to form a third cam surface 87 (FIG. 3).

The driven gear 51 has a periphery with teeth which is provided with a cut-out portion 89 as best illustrated in FIGS. 1 and 8. The gear 51 is attached to an end of the shaft 55. The cam unit is mounted on the support 36 with the shaft 55 being received in the bearing 49 so that the cam surfaces are on the back side of the support 36 and the gear 51 is positioned on a front surface of the support. As best illustrated in FIG. 8, the end of the shaft 55 is provided with a flat segment and the gear 51 has a corresponding aperture so that when received on the shaft 55, the gear 51 is keyed thereto. The post 77 of the segment element 53 also is provided with a flat segment and is received in a keeper plate 90 which is held on the end of the post by a threaded member such as screw 91. The coaction of the keeper plate or disc 90 and the screw 91 along with the post 77 form the means 54 for interconnecting the elements together. The plate or disc 90 has an arcuate groove 92 which receives a threaded fastener such as screw 93 which clamps the disc 90 in a fixed adjusted position on the gear 51. Indicia are privided on the disc to match with a line on a projection 94 of the gear 51. By turning or rotating the disc 90 relative to the gear 51, the segment member 53 is rotated relative to the center member 52 to change the arcuate length of each of the cam surfaces 85, 86 and 87.

The cooperate with each of the cam surfaces 85, 86 and 87, the control device 20 includes means for controlling actuation of the valves 32, 33 and 34 with each of the means having a follower and preferably being a switch means having an actuator engaging one of the cam surfaces to hold the switch in one position and allowing the switch to shift to a second position when the actuator or follower leaves its cam surface. The three switch means include a first switch means 100 having a follower 101, a second switch means 102 having a follower 103, and a third switch means 104 having a follower 105. The switch means 100 and 104 are mounted by means such as screws in a stacked relation on the post 37 and 38 with their followers 101 and 105 in alignment. The second switch means is mounted by means such as screws on the post such as 39 and 40 in spaced relationship to the first and third switch means. As illustrated, the follower 101 engages the cam surface 86 (FIG. 6), the follower 103 engages the cam surface 85 (FIG. 5), and the follower 105 engages the cam surface 87.

To rotate the cam unit 50, the control device 20 includes a constant speed motor unit 110 which has an output shaft 111 and is mounted on the back surface of the support 36. The shaft 111 has a pair of pinion gears 112 and 113. The gear 112 meshes with a pinion 114 which has a reduced size gear 115 and is mounted on a shaft 116 which is received in the slot 48 and biased towards engagement with the driven gear 51 by a spring 117. As illustrated in FIG. 1, the cam unit 50 is in a service or neutral position with the cut-out 89 receiving the pinion 116 so that rotation of the pinion does not cause rotation of the cam unit 50.

To rotate the cam unit 50 from the neutral or service position so that the gear 51 is engaged by the drive pinion 115, the control unit 20 illustrated in FIGS. 1, 3 and 8 include two means for shifting the control unit to engage the driven gear 51 with the rotating pinion gear 115. In FIG. 3, the means for rotating includes a solenoid 120 which is mounted on a back surface of the support 36. The armature of the solenoid 120 is attached to a thin metal element 121 which has a free end bent into a resilient hook shape that terminates in a pawl 122. The element 121 is supported in a slot of a block 123 with its pawl 122 engaged in the V-shaped groove 67 of the flange 58 as the solenoid and member 121 are in a rest position. When the solenoid 120 receives an initiating signal, its armature pulls the member 121 to the left (FIG. 3) against a return spring 124 to rotate the cam unit 50 in the direction of arrow 125 (FIG. 8). As the cam unit 50 is rotated in the direction of arrow 125, the teeth of the driven gear 51 will mesh with the drive pinion 115 which may yield in slot 48 in the direction of arrow 126 to enable meshing of the teeth. After the pinion 115 has meshed with the driven gear 51, it will rotate the unit 50 until the gear 115 is received in cut-out portion 89 after one revolution of the unit. As the solenoid 120 is de-energized, the spring 124 returns the member 121 to the rest position and the pawl 122 rides on the periphery of the flange 58 as the unit 50 is rotated and the pawl 122 will re-enter groove 67 as the unit returns to the service position.

The control drive also includes a second means for rotating the cam unit 50 from the service or neutral position which includes a lever or trip arm 130 which is pivotably mounted on the post 45 and biased by a spring 131 to the position illustrated in FIG. 1 with a free end 132 withdrawn from the path of movement of the projection 94 and the driven gear 51. Pivoting of the trip arm 130 in a counterclockwise direction of arrow 133 (FIG. 8) against the force of the spring 131 causes the free end 132 to engage the projection 94 to rotate the driven gear in the direction of arrow 125 and into meshing relation with the pinion 115. The arm 130 includes a handle portion 134 which allows manual pivoting of the arm 130.

A calendar device 135 is also provided in the control device 20 for pivoting the arm 130 at the predetermined intervals of time. The calendar device 135 includes a day gear 136, which is mounted for rotation on the post 43, a star wheel 137, which is mounted on a post 46 adjacent to the day gear 136, and drive means comprising the gear 113 and gears 138–141 for connecting the day gear 136 in driving relation to the motor unit 110.

The day gear 136 has a periphery which has teeth for engaging gear 141 and has an integral radially extending projection 142 which has an indicator protrusion 143. An upper surface of the day gear 136 is provided with a series of projections and grooves 144 and with an axial recess 145 (FIG. 7). A dial member 146 is telescopically received on the post 43 with the day gear 136 and is provided with grooves and recesses which coact with the grooves and recess 144 to prevent relative rotation between the dial member and the day gear 136. The dial member 146 has an axial cup-like portion 147 which extends into recess 145 and receives a cup-shaped indicator member 148 which is keyed to the post 43, which is provided with a flat, to prevent relative rotation therebetween. A spring retainer 149 and a compression spring 150 form means for biasing the dial member 146 into engagement with the day gear 136 and for biasing the teeth of the day gear 136 into engagement with the gear 141. However, the spring 150 enables axial shifting of both the day gear 136 and the dial member 146 relative to each other and to the post 43. Thus, by shifting the dial member 146 relative to the day gear 136, the desired time for commencement of the conditioning operation can be obtained by aligning the projection 143 at the time indication on the dial member, for example approximately 3:45 at night (FIG. 1). Then to set the clock to the correct time, the dial member 146 and the day gear 136 are shifted together to disengage the teeth of the day gear 136 from the gear 141 and then rotated to align the exact time of day with the pointer on the indicator 148.

The star wheel 137 (FIG. 9) is mounted for relative rotation on the post 46 and is formed by a pair of plastic molded members 151 and 152 (FIG. 9) and a plurality of metal abutment elements 153 which are assembled together and held in the assembled relation by a threaded fastener such as a screw 154 which is engaged in the post 46. The member 151 has a radially extending flange 155 which coacts with a plurality of radially extending projections 156 to form circumferentially spaced recesses 157. In the particular star wheel illustrated, six projections form six recesses although the star wheel can be replaced by one having seven projections to form seven recesses. The flange 155 on a lower surface in radial alignment with each of the projections 156 has a pair of spaced integral ratchet teeth 158, 159. The ratchet teeth are engaged by a flexible resilient pawl 160 which is mounted on the support 36.

As best illustrated in FIGS. 8 and 9, each of the radial extending projections 156 has a slot extending axially and cooperating with radially extending slot on the member 152 to form a guideway for receiving the abutment member 153 for each of the recesses 157. Each of the abutment members on a surface facing towards the hub are provided with a pair of spaced grooves 161, 162 which will receive a portion of an O-ring 163 which is partially received in an annular groove of the member 152. The O-ring 163 and the groove 161 cooperate to hold each abutment 153 in a retracted or withdrawn position with the free end adjacent to the lower surface of the flange 155 and the groove 162 and the O-ring 113 cooperate to hold the abutment in an extended position with the free end extending below the flange 155.

When in the extended position, the abutment will lie in a path of a portion formed by a projection 165 on the trip arm 130. If all the abutments are in the extended position, each rotation of the portion of a revolution will cause the abutment adjacent the projection 165 to engage the projection 165 and pivot the arm 130 to rotate the cam unit 50 from the service position. However, if the abutment adjacent to the projection 165 is in the withdrawn position, rotation of the star wheel 137 will not cause any pivoting of the arm 130.

The calendar device 135 operates in the following manner. With each revolution of the day wheel which occurs once every 24 hour period, the projection 142 will engage one of the projections 156 of the recess 157 and rotate the star wheel through a portion of an arc in a direction of arrow 167. If the abutment 153a, which is two spaces in the clockwise direction from the projection 156 being engaged by the projection 142 of the day gear 136, is in the extended position, the trip arm 130 will be pivoted. If, however, that particular abutment 153a is in the retracted position, the star wheel 137 will not cause tripping of the arm 130 for that particular day. It should be pointed out that at the completion of the tripping operation or rotation of the star wheel, the pawl 160 will engage one of the ratchet teeth 158 to prevent movement of the star wheel in a direction opposite to the arrow 167. As the projection 142 of the day wheel 136 engages the projection 56 forming the recess 57, the pawl 160 passes over tooth 159 as the abutment 153a engages the projection 165 to prevent any backward movement as the trip arm 130 is being pivoted.

By adjusting the position of each of the six abutment members 153, various intervals can be obtained. For example, if all of the abutment members are in the extending position, the trip arm will be actuated once a day at the designated tripping time. If alternate abutments are shifted to the retracted position, then although the star wheel is revolved a portion of a revolution each day, the trip arm will ony be pivoted every other day. While the star wheel 137 is illustrated as having six recesses and six abutments, it could be replaced by a similar star wheel of the same construction but having seven recesses and abutments with each abutment corresponding to a particular day of the week. If the control device 20 was then used on an installation such as in a business or factory which did not have a high utilization of water on Saturdays and Sundays, the various abutments could be set to provide regeneration of the apparatus prior to the commencement of each working day and to skip regeneration prior to Sunday or both Saturday and Sunday. In a home installation, a control device having a seven abutment star wheel could be set to have recycling occurring after particular days in which a large demand on the softened water is made.

The control device 20 may be utilized to control regeneration of the water softening device such as 21 which device only requires a "two cycle" regeneration operation which includes passing a brine solution through the resin bed 23 with rinsing of the excess brine from the bed and then filling of the brine tank 30. A "two cycle" regenerating system does not require either the segment element 72 or the third actuating switch means 104.

Figure 11:
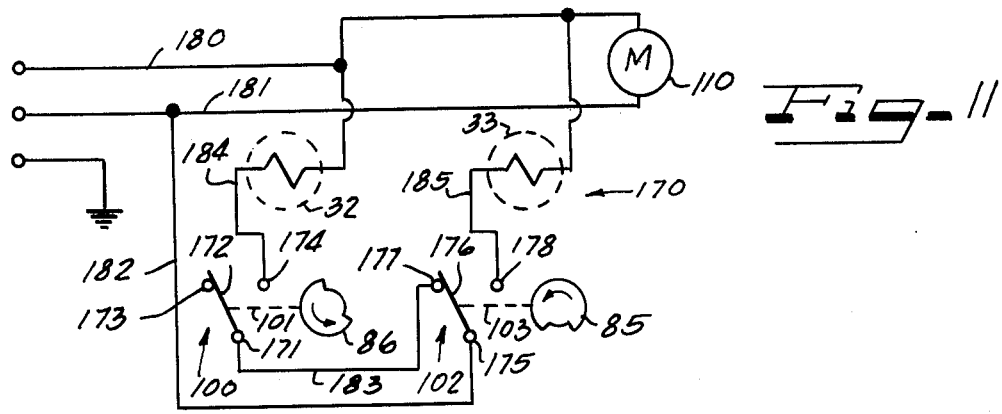
FIG. 11 is a schematic wiring diagram illustrating electrical connections for the control device of the present invention for a two cycle system.

The electrical system or circuitry for a "two cycle" regeneration system is illustrated in FIG. 11 and is generally indicated at 170. The switch means 100 has a common terminal 171 with a switch member 172 moveable between a pair of contacts or terminals 173 and 174 to respond to movement of the follower 101. The switch means 102 has a common terminal 175 with a switch member 176 moveable between contacts or terminals 177 and 178 in response to movement of the follower 103. The motor unit 110 is connected across power lines 180 and 181. The common terminal 175 of the switch means 102 is connected by a wire 182 to the line 181 and one of its terminals 177 is connected by a line 183 to common terminal 171 of the switch means 100. The terminal 173 of switch 100 is connected by a line 184 to a terminal of the solenoid 32 of the solenoid actuated valve whose other terminal is connected to line 180. In a similar manner, the terminal 178 of the switch means 102 is connected by a line 185 to a terminal of the solenoid actuated valve means 33 whose other terminal is also connected to the power line 180.

When the cam unit 50 of the control device 20 is in the service position, the follower 101 engages the cam surface 86 and holds the switch member 172 against terminal 173 and the follower 103 engages the cam surface 85 and holds the switch member 176 against the terminal 177. Thus, the circuit to both of the solenoid actuated valves 32 and 33 are open while the cam unit 50 is in the service position. When the cam unit 50 has been rotated from the service position, the cam surfaces 86 and 85 rotate in the direction of the arrows. As the follower 101 of the switch means 100 falls off or leaves the cam surface 86, the switch member 172 is shifted, such as by an internal spring of the switch means 100, into engagement with the terminal 174 to close the circuit to the solenoid to actuate the valve 32. With actuation of solenoid valve 32, the valve member or members in the valve housing 25 will by-pass the inlet supply 24 to the outlet supply 28 (FIG. 10) and also pass water through an eductor device through the conduit 26 to draw a brine solution from the brine tank 30 and pass it through the bed 23. After all of the brine solution has been passed through the bed 23, the continuous passing of fresh water will rinse any residue brine from the bed which then flows out through the drain 31. As the follower 101 again is pulled onto the cam surface 86, the switch member 172 is switched back to the terminal 173 to open the circuit and de-energize the solenoid actuated valve 32. With additional rotation, the follower 103 of the switch means 102 leaves the cam surface 85 and moves the switch member 176 to contact 178 to close the circuit through the solenoid actuated valve 33 which valve will cause movement of the valve member of housing 25 to cause refilling of the brine tank with water to produce brine for the next regeneration operation. As mentioned hereinabove, movement of disc 90 relative to gear 51 will adjust the relative position of the center member 52 and the segment member 53 and adjusts the lengths of both of the cam surfaces 85 and 86. Thus, if water conditions dictate an increase in the amount of brine, an adjustment to change the length of the cam surface 86 to change the amount of brine solution being used during the regeneration operation simultaneously changes the length of the cam surface 85 which controls the time for refilling or adding water to the tank 30 to make brine for the next operation.

Figure 12:
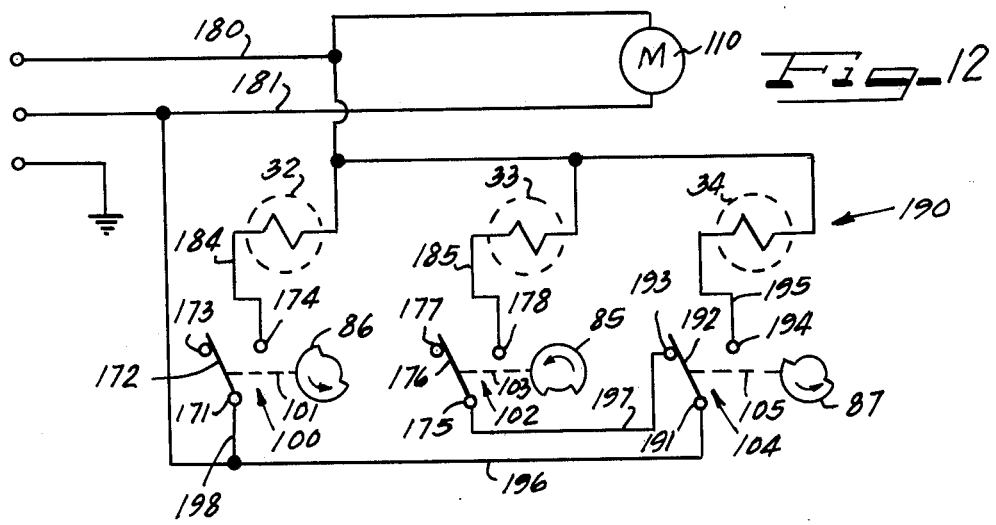
FIG. 12 is a wiring diagram illustrating electrical connections for a five cycle system.

As illustrated in FIGS. 3 and 4, the control device 20 includes a third cam surface 87 formed by a coaction of the segment element 72 with partial cylindrical surface of the segment member 53, and will control a regeneration operation known as a "five cycle" regeneration operation. The electrical circuitry or system for a "five cycle" system is illustrated in FIG. 12 and is generally indicated at 190 with the same elements of the previously described system utilizing the same numbers. The third switch means 104 has a common terminal 191 with the switch member 192 which is moved by follower 105 between terminals or contacts 193 and 194. The terminal 194 is connected by a line 195 to a terminal of a solenoid actuated valve 34 whose other terminal is connected to the power line 180. Common terminal 191 is connected to power line 181 by line or connector 196. Terminal 193 is connected to the common terminal 175 of the switch means 102 by line 197 and the common terminal 171 is connected to line 181 by a line 198, 196.

As in the system 170 when cam unit 50 is in the service position, the followers 101, 103 and 105 hold their respective switch members 172, 176 and 192 against respective terminals 172, 177 and 193 to open the circuit to each of the solenoid actuated valves 32, 33 and 34. When the cam unit 50 is rotated from the service position, the cam surfaces 85, 86 and 87 will rotate in the direction of the arrows.

As the cam surfaces rotate, the follower 105 for the switch means 104 leaves the cam surface 87 and shifts the switch member 192 to terminal 194 to energize the solenoid actuated valve 34 which causes the valve member or members in the valve housing 25 to by-pass the water inlet line 24 to the water outlet line 28, to pass water down conduits 27 and to connect the conduit 26 to the drain line 31 to cause backwashing of the bed 23 of the apparatus 21 to remove sediments such as iron and other minerals. When the follower 101 of switch 100 leaves the cam surface 86, the switch member 172 moves to terminal 174 to complete the circuit to the solenoid actuated valve 32 which causes a second shifting of the valve member or members of the housing 25 to connect conduit 27 to drain line 31 and to pass water through the eductor device to draw brine from the brine tank 30 through the conduit 29 to be discharged through the conduit 26 with the liquid passing through the bed 23 to regenerate the bed. After all of the brine solution has passed through the bed, the continued flow of water through the bed rinses any excess brine therefrom. This rinsing is known as a low flush or rinse.

Due to the projection or protrusion 84, the cam follower 105 of the switch means 104 will re-engage the cam surface 87 about 5 minutes before the follower 101 for switch means 100 and de-energize the solenoid valve means 34. When solenoid 34 is de-energized, it causes shifting of the valve members in housing 25 to obtain a high rate of water flow through the bed to provide a fast flush or rinse for a period of about 5 minutes until the follower 101 re-engages cam surface 86 to break the circuit to the solenoid valve 32.

With the switch member 192 engaging terminal 193, power is applied to common terminal 175 of the second switch means 102 so that as its follower leaves the surface 85, the switch member 172 will engage contact 178 to complete the circuit to the solenoid actuated valve means 33 to refill the brine tank 30 with sufficient liquid to produce brine for the next regeneration operation.

As in the previous system, relative rotation between the segment member 53 and the center member 52 simultaneously changes the lengths of all three cam surfaces 85, 86 and 87. However, the adjustable mounting of the segment element 72 enables changing of the length of the cam surface 87 independent of changes in length of the cam surfaces 85 and 86. In certain installations such as commercial installations for either the "two cycle" or the "five cycle" regenerating system, the pressure of the water is higher than normal pressure found in home installations. Thus, with a higher pressure, the time for refilling the brine tank with sufficient water to form a new brine solution may be greatly diminished over the time necessary for drawing the brine solution from the tank and for rinsing the bed. Thus, it may be desirable to use a segment element such as 69 (FIG. 5) to independently increase the length of the cam surface 85.

When a calendar system such as system 170 or 190 is utilized for the control device, regeneration occurs at a fixed interval regardless of whether the resin bed 23 of the apparatus 21 requires a regeneration operation. When the amount of fluid being softened by an apparatus 21 varies, it is possible that regeneration may be required sooner than the interval dictated by the settings of the calendar device. Thus, if a high demand is placed on the apparatus 21 so that regeneration is required before the time which was scheduled or set on the calendar device, a manual initiation can be obtained by manually pivoting the trip arm 130. Usually the interval between operations which is set on the calendar device is shorter than necessary and the calendar device will initiate regeneration sooner than necessary and result in some waste of the salts which are required for regeneration operation. This waste of salt, which occurs when the calendar device starts a regeneration operation before it is required, is accentuated when consumption of soft water is reduced.

Figure 13:
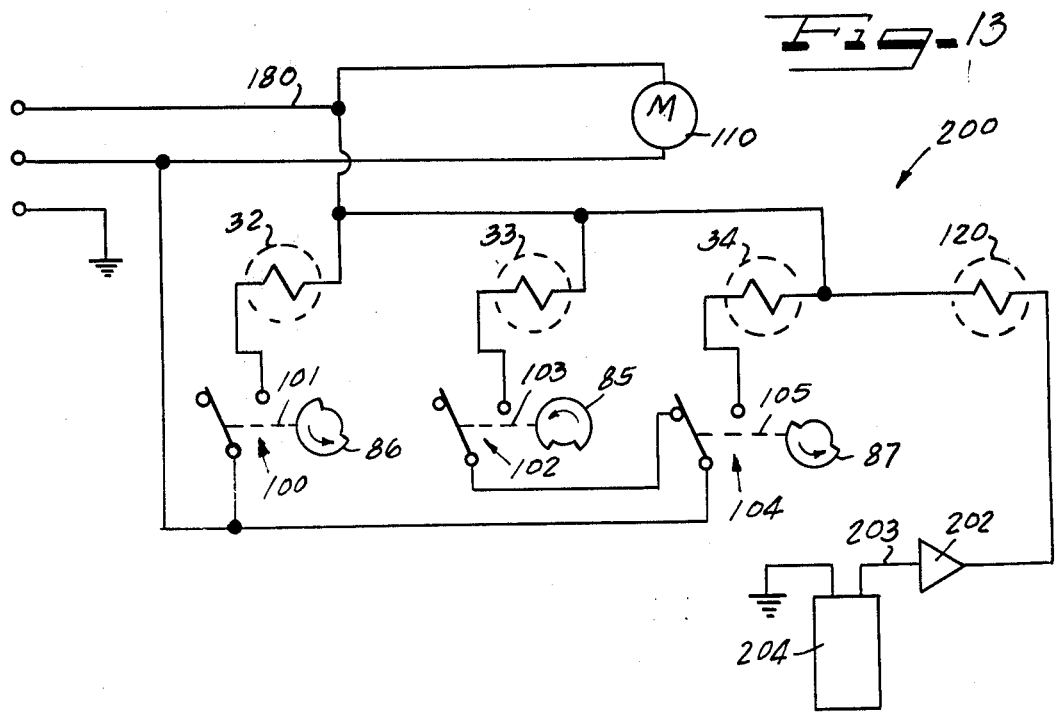
FIG. 13 is a wiring diagram of a five cycle system actuated by a sensed condition in the treatment apparatus.

A more efficient utilization of the salt for regeneration occurs when the initiating signal is achieved by sensing the condition of the bed 23 in the apparatus 21. In FIG. 13, the system 200, which is a five cycle regenerating system utilizes a solenoid 120 which is connected to the power line 180 and receives a signal from an amplifier 202 which is preferably mounted in the housing 35 of the control device 20. The amplifier 202 amplifies a signal delivered on a line 203 from a probe 204 which is positioned in the resin bed 23 of the apparatus 21. The probe 204, as mentioned above, senses the condition of the resin bed such as the change of resistivity adjacent the probe which change occurs as the bed is depleted. When the resistivity changes, the probe generates a signal which is amplified by the amplifier 202 to actuated the solenoid 120 to initiate the regenerating operation by rotating the cam unit 50 from the service position. The remaining portion of the system 200 is the same as the five cycle system 190 and with the rotation of the cam unit 50 from the service position, the switches 100, 102 and 104 operate in a sequence which is controlled by their respective followers 101, 103 and 105 engaging cam surfaces 86, 85 and 87 to sequentially close the circuit to actuate solenoid valves 32, 33 and 34. While the provision of the probe and the solenoid 120 is illustrated in a five cycle system, the two cycle system 170 can be modified by providing the solenoid 120 connected to power line 180 and by providing an amplifier 202 in the housing which amplifier receives a signal from the probe 204.

While the control system utilizing the solenoid 120 to rotate the cam unit 50 from the service position does not require the calendar device, it is preferably included in the control system for one or both of the following reasons. By providing the calendar device 135, the calendar device is available to shift to a calendar controlled system if the probe system malfunctions. It is also sometimes found desirable to utilize the calendar system with some of the abutments moved to the extended position with the remaining abutments withdrawn to ensure a calendar actuated regeneration operation after a fixed interval of time of 2 or more days.

Figure 14:
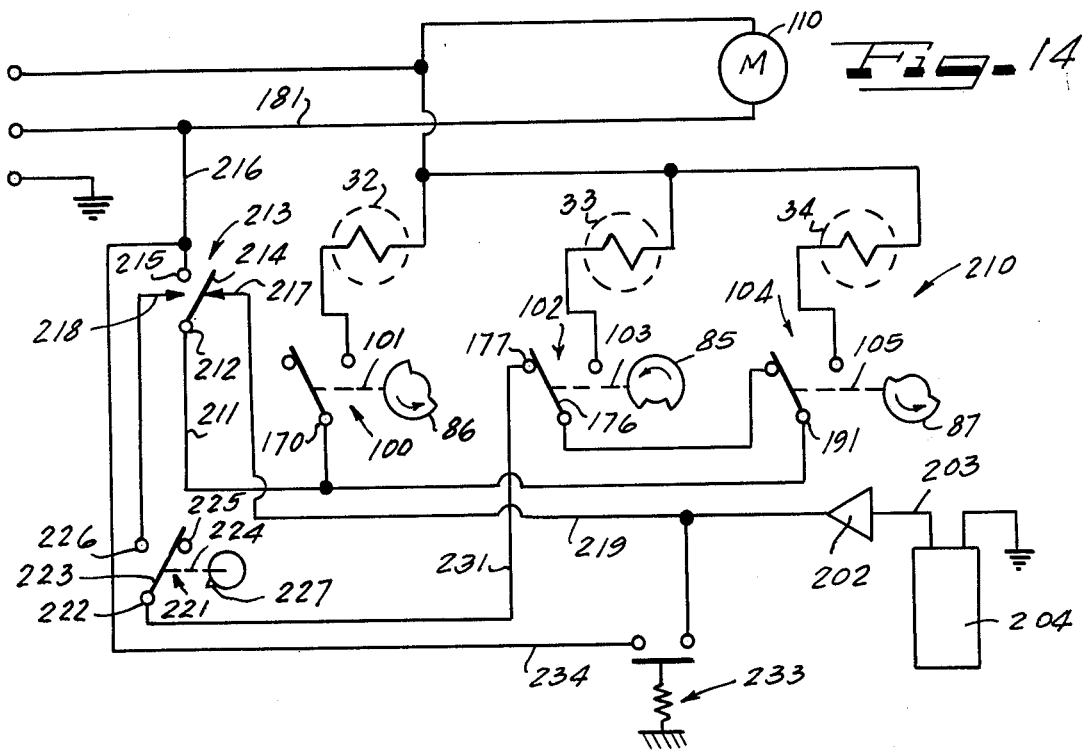
FIG. 14 is a wiring diagram for the control device of the present invention when utilized in a delay sensed system.

While rotation of the cam unit 50 from the service position in response to a sensed condition provides the most efficient use of the salt utilized for regeneration, it does have one major drawback which is that regeneration may occur at any time during the day. Thus, the probe may sense and command regeneration as a housewife is washing laundry. Since the water inlet 21 is by-passed to the water outlet 28 during the regeneration operation, only untreated or hard water would be available to complete the washing of the laundry. To overcome these difficulties, a delay sensed system is proposed and is generally indicated at 210 in FIG. 14 which illustrates the electrical circuitry for the system.

In the delay sensed system 210, common terminals 170 of the switch means 100 and 191 of the switch means 104 are connected by a line 211 to a terminal 212 of a delay relay 213, which has a switch element 214 moveable to a contact or terminal 215 to complete a circuit by a line 216 to the power line 181. The delay relay 213 has a latching terminal 217 which when it receives a signal moves the switch member 214 to close a circuit between terminals 212 and 215. The relay also has a reset or break terminal 218 which when it receives a signal kicks the member 214 out of electrical contact with the contact 215. The delay relay switch 213 is commercially available and an example of this type of switch is sold by Potter-Brumfield Manufacturing under Part No. KUL-4072, which utilizes diodes so that a single electrical pulse applied to terminal 217 causes latching of the member 214 with the contact 215 and in a similar manner, a single electrical pulse to the terminal 218 causes breaking of the contact between the switch member 214 and the contact 215.

The control unit of system 210 utilizes the amplifier 202 which amplifies a signal received on line 203 from the probe 204 and applies it to the latch terminal 217 via line 219. To reset or break contact between the member 214 and contact 215 of the delay relay 213, the control device includes a fourth switch means 221 which has a common terminal 222 connected to a switch member 223 moveable by a follower 224 between contacts 225 and 226 with the member 223 biased against the contact 225. The switch means 221 (illustrated in broken lines) is mounted on the second switch member 102 (FIG. 4) with its follower 224 aligned with the follower 103. The flat surface 80 of the cam segment 53 is provided with a projection 227 adjacent to the wall 83 which projection will engage the follower 224 after the follower 101 has returned back onto the cam surface 85. As the projection 227 hits the follower 224, the switch member 223 is shifted against the spring forced to make contact between the terminal 222 and 226. As illustrated, the terminal 226 is connected to the reset terminal 218 and the common terminal 222 is connected via line 231 to terminal 177. In addition, an electrical by-pass is provided by a push-button switch 223 which when pushed closes a circuit in line 234 to apply a pulse to close the latching contact 217.

Since a bed 23 during softening water is exhausted first at the upper surface with the exhausted level moving down through the bed as the total bed is gradually exhausted, the probe 204 is positioned at a level in the bed 23 which provides a sufficient reserve for the bed to continue to be used for a period of time. Preferably, the reserve is sufficient to allow treatment for 24 hours.

The calendar device 135 is set with all of the abutments 153 in the extended position and the day wheel is set to initiate pivoting of the trip arm 130 at a convenient time, for example 1 A.M. Thus, at 1 A.M. every day the trip arm 130 rotates the cam units from the service position and the motor 110 will rotate the cam unit through one revolution back to the service position.

If the probe 204 senses that regeneration is required at some time prior to 1 A.M., the signal from the probe 204 is amplified and applied to latching terminal 217 to shift or latch member 214 in contact with terminal 215 to close the circuit between power line 181 and common terminals 170 and 191. At 1 A.M., the calendar device 135 pivots trip arm 130 to rotate the cam unit 50 from the service position and into driving mesh engagement with pinion gear 116. As the cam unit 50 rotates, the followers 105, 101 and 103 actuate their respective switch means 104, 100 and 102 to sequentially back flush the bed 23, apply the brine to regenerate the bed, rinse the bed, high flow rinse and then refill the brine tank 30. As the follower 103 returns to cam surface 85 it moves the switch member 176 into contact with terminal 177 to close the circuit to common terminal 222 of the fourth switch means 221, and shortly thereafter projection 227 engages follower or arm 224 to shift switch member 223 against the spring pressure to terminal 226 to apply a signal to reset terminal 218. When a signal is applied to reset terminal 218, the switch member 214 is kicked out of contact with terminal 215 to open the circuit to the common terminals 170 and 191 of the switch means 100 and 104. If during the next period the probe 204 does not sense the need to regenerate the bed 23, and the calendar device 135 pivots the arm 130 to rotate the cam unit 50 from the service position, the switches 100, 102, 104 and 221 will be actuated in the desired sequence, but due to the open circuit caused by the reset condition of the delay relay, the solenoid valve will not be energized and the regeneration process will not occur.

While the delay sensing system 210 was described and illustrated for a "five cycle" system, the "two cycle" system 170 can be modified to be a delay sensing system. This is accomplished by providing a delay relay 213 in line 182, by providing switch means 221 the amplifier 202, and probe 204. In either a "five cycle" or "two cycle" delay sensing system, the regeneration operation will only occur at a specific time which is set on the day gear and controlled by the calendar device and only if prior to rotating the cam unit from a service position, the delay relay is latched by either pushing the switch 233 or by a signal from the probe 204.

Figure 15:
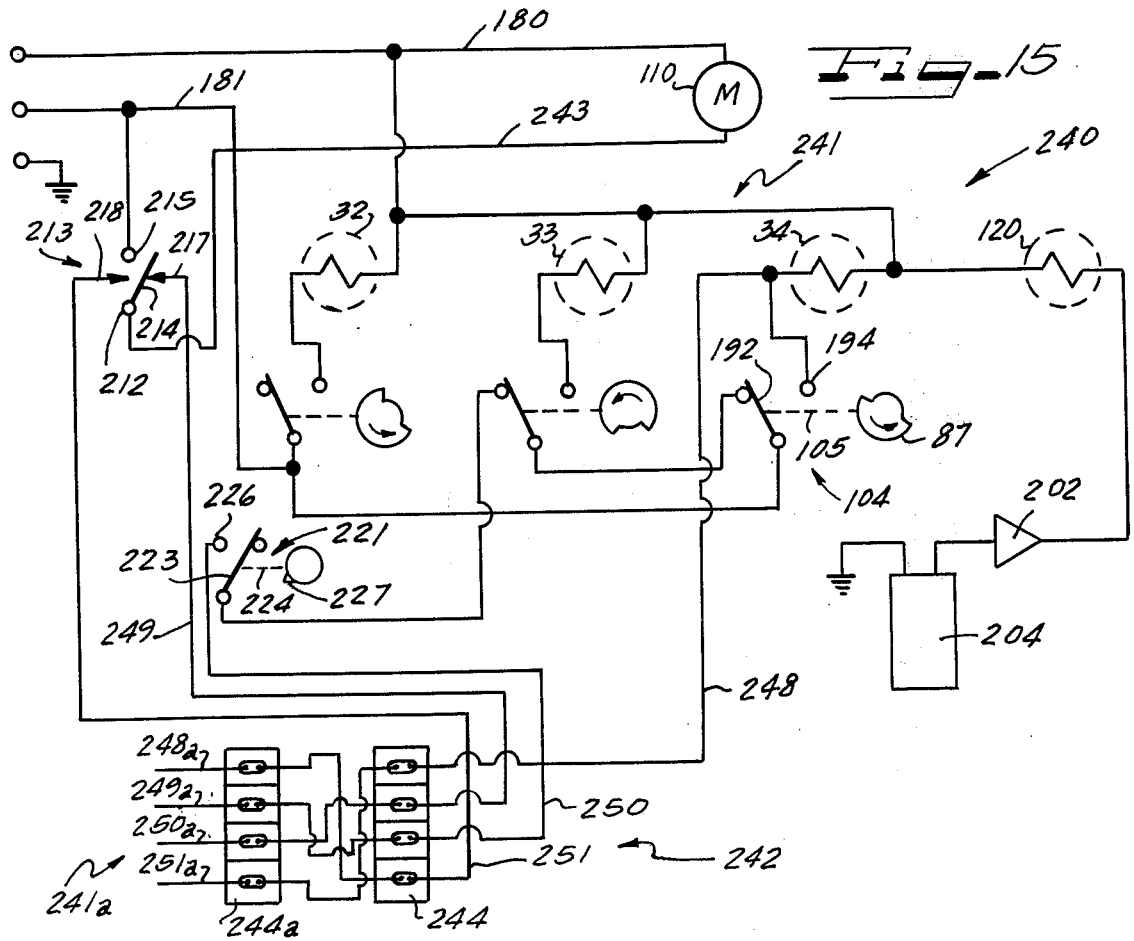
FIG. 15 is a wiring diagram for the control device of the present invention when used in a duplex system.

The control device 20 can be utilized for controlling regeneration of a water softening or conditioning device which is arranged as a duplex system. In such an arrangement, the two water conditioning devices are provided with a control system 240 which is composed of a control device 241 on one conditioning device connected by an interlock means generally indicated at 242 to a second control device 241a on the second conditioning device (FIG. 15). As in the previous embodiment, power on line 180 is supplied to one side of the motor 110, to one side of the solenoids 32, 33 and 34 and to solenoid 120 of each device 241, 241a. The other terminal of the motor is connected by a line 243 to a terminal 212 of a delay relay 213 with the terminal 215 connected to the other power line 181 to complete the circuit to the motor unit. Each of the switch means 100, 102 and 104 have their common terminals connected to the power line 181 in the same manner as the "five cycle" system 190 of FIG. 12. The solenoid 120 is connected to receive an amplified signal from the amplifier 202 which amplifies the signal from the probe 204.

The interlocking means 242 includes terminal blocks 244 and 244a with block 244 separately receiving four lines 248–251 and block 243a separately receiving lines 248a–251a. Line 251 extends from the reset terminal 218 of the delay relay 213. Line 250 extends from the contact terminal 226 of the fourth switch means 221. Line 249 extends to the latching terminal 217 of the delay relay 213. Line 248 extends from the switch means 104 and its respective solenoid 34. Lines 248a, 249a, 250a and 251a of device 241a each extend to corresponding terminals or points in device 241a and are corresponding lines in the second device. The two terminal blocks 244 and 244a are interconnected so that line 248 is connected with line 251a, line 249 is connected to line 250a, line 250 is connected to line 249a and line 251 is connected to 248a.

Thus, a signal or pulse on line 249 will cause the delay relay 213 to move to a latched position and a signal or pulse on line 251 will cause the relay to move to an unlatched or open position. Due to the interlocking means 242, the signal applied on line 249 is generated on line 250a of the second or other control unit 241a and a signal on line 251 is generated on line 248a of the second control system.

Operation of the duplex system assumes that a delay relay 213 of each control unit or device 241 and 241a is in a closed or latched position so that current is applied to the respect motor unit 110. When the probe 204 senses that regeneration is necessary in the first system, the solenoid 120 is actuated to initiate movement of the cam unit 50. As the follower 105 leaves the cam surface 87 to move the switch member 192 into contact with the contact 194 to energize the solenoid operated valve means 34, a pulse is transmitted on line 248 to the terminal block 244 and to line 251a which causes unlatching of the delay relay of the other device 241a to de-energize the motor unit of the other device 241a. Therefore, even if the probe of the other device 241a senses the required regeneration and causes rotation of the cam unit of the other control device 241a from the service or neutral position, the motor unit is de-energized and will not rotate the cam unit. As the first cam unit of the first device 241 continues to rotate, switches 104, 100 and 102 are actuated by the movement of their respective followers 105, 101 and 103 on and off the cam surfaces 87, 86 and 85 to control regeneration of the apparatus associated with control device 241. After the refill solenoid 33 is de-energized by the follower 103 of switch means 102 returning to the cam surface 85, the follower 224 of the fourth switch means 221 engages the projection 227 to shift member 223 to contact 226 to send a pulse on line 250 to the terminal block 244. The pulse on line 250 is connected to line 249a to latch the delay relay of the other control device 241a so that a regeneration cycle can occur.

Assuming both device 241 and 241a are in a latched condition and the probe of the other device 241a initiates regeneration, the movement of the cam device causes the backwash control switch to be operated. As the backwash control switch energizes its solenoid, a pulse is transmitted on line 248a which is connected to the line 251. The pulse or signal on line 251 is applied to the reset terminal 218 to open the delay relay 213 to de-energize current to the motor unit 110. As the other device 241a proceeds sequentially through the regeneration operation and completes the operation, its fourth switch means will send a pulse on the line 250a which is connected to line 249. The pulse on line 249 will cause a latching of the delay relay 213 and the re-application of power to motor unit 110.

The purpose of the interlocking means is to prevent both control devices 241 and 241a from conducting a regeneration operation simultaneously. If both of the control devices 241 and 241a receive a signal to start regeneration, the first device to start the backwash will send a signal to de-energize the other device and prevent the other device from commencing the regeneration operation. However, upon completion of the regeneration operation by the first device, the other device will be re-energized to continue with the regeneration operation. While the discussion of the interlock was utilized with the "five cycle" type system, the same interlock system could be utilized with a "two cycle" system which would require some modifications. For example, the line 248 would extend to the switch means 100 and its respective solenoid 32 so that once they were energized, the opening signal to unlatch the delay relay of the other system would be produced.

Figure 16:
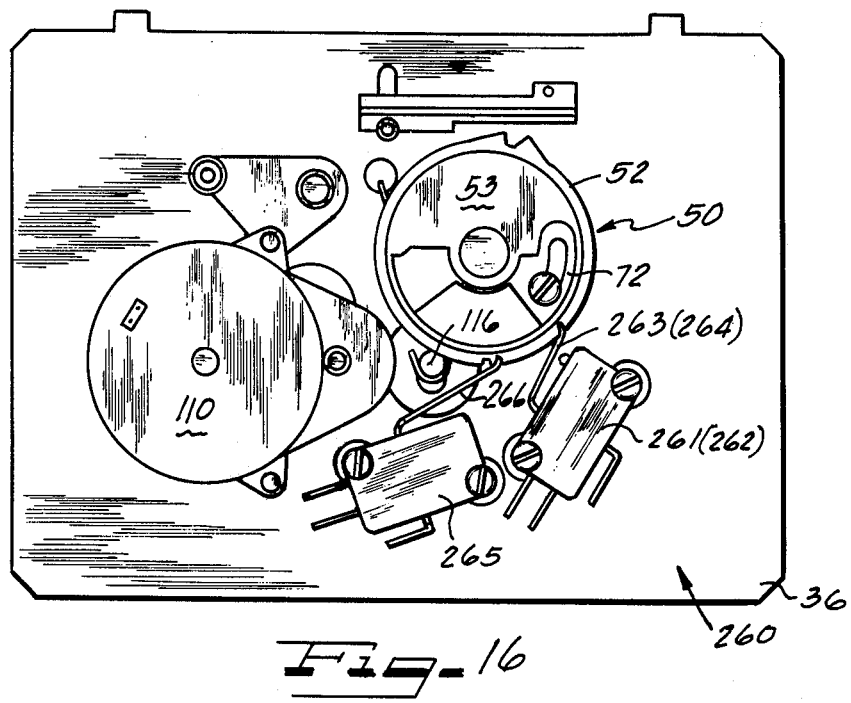
FIG. 16 is a back view of an embodiment of the control device of the present invention.
Figure 17:
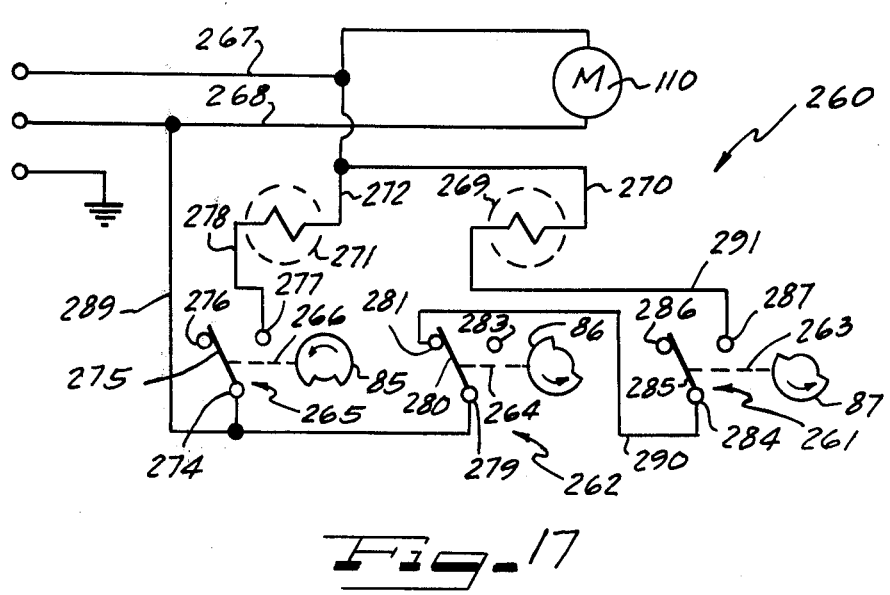
FIG. 17 is a wiring diagram for the embodiment when used for controlling cleaning a filter.

While the control device has been disclosed in various systems for controlling regeneration of a water softener, the control device with a slight modification may be utilized for controlling reconditioning of a filter or other water conditioning devices. In FIGS. 16 and 17, a control device 260 which has been modified for cleaning a filter device is illustrated.

The device 260 utilizes the motor unit 110, which drives the pinion gear shaft 116 to rotate a cam unit 50 which is provided with the segment element 72 to form the three cam surfaces 85, 86 and 87. A backwash or back flush start switch 261 and a backwash stop switch 262 are mounted in stacked relationship on support 36 with their respective followers 263 and 264 aligned and engaging cam surfaces 87 and 86, respectively. A fast rinse switch means 265 is mounted on support 36 with its follower 266 engaging cam surface 85.

The wiring diagram for the control device 260 is illustrated in FIG. 17. Power lines 267 and 268 extend to motor 110. A solenoid actuated valve 269, which is a backwashing control valve, has one terminal connected by line 270 to line 267 and a second valve 271 is also connected by a line 272, 270 to the power line 267.

The fast rinse switch means 265 has a common terminal 274 with a switch element 275 moveable by follower 266 between contacts or terminals 276 and 277 and terminal 277 is electrically connected by line 278 to the other terminal of a solenoid 271. The switch means 262 has a common terminal 279 extending to a switch member 280 which is moveable by follower 264 between contacts or terminals 281 and 283. The switch means 261 has a common terminal 284 with a switch member 285 which is moveable by follower 263 between contacts or terminals 286 and 287. Common terminals 274 and 279 are connected to power line 268 by a line 289 and the contact 281 of the backwash stop switch 262 connected by line 290 to the common terminals 284 of the backwash start switch 261. The contact 287 of the backwash start switch 261 is connected by a line 291 to the solenoid 269.

When the cam unit 50 is in the service position, cam surface 87 holds the switch member 285 out of engagement with the contact 287, cam surface 86 holds the switch member 280 in engagement with contact 281 so that current is applied to the common terminal 284 of the switch means 261 and cam surface 85 holds the switch member 275 out of engagement with contact 277. Thus, each of the solenoids 269 and 271 are in an open circuit. The control unit 260 uses a calendar device such as 135 (FIG. 1) to pivot lever 130 to engage the projection 94 to rotate the cam unit 50 into engagement with the gear 115 just as in the previous embodiments. As the cam unit rotates, the follower 263 of the switch 261 leaves the cam surface 87 and switch member 285 is moved by resilient means to close the circuit between the common terminal 284 and contact 287 to apply current to the solenoid valve 269 to start a backwashing of the filter bed. When the follower 264 leaves the cam surface 86, the switch member 280 moves from contact 281 to break the circuit applying power to a common terminal 284 of the switch 261 and the solenoid 269 is de-energized to stop the backwashing. Further movement of the cam unit during its revolution causes the follower 266 of the switch means 265 to leave the cam surface 85 to switch the switch member 275 into engagement with contact 277 to energize the solenoid 271 which in turn controls the valve to start a fast rinsing of the filter bed. As the follower 266 reengages the cam surface 85, the solenoid 271 is de-energized and the cam unit 50 continues to rotate until it returns to the service or neutral position. As in the previous embodiments, adjustment in the position of the element 72 on the center member 52 varies the length of the backwashing cycle and relative rotation between the segment member 53 and the center member 52 will vary the length of the fast rinse.

Although various minor modifications may be suggested by those versed in the art, it should be understood that I wish to employ within the scope of the patent granted hereon all such modifications as reasonably and properly come within the scope of my contribution to the art.

I claim:

1. A device for controlling actuation of valves of a liquid treatment apparatus during a reconditioning operation performed thereon, comprising a support; a compound cam unit mounted on said support for rotation, said cam unit including a driven gear having a cut-out segment in its periphery, a center member attached to the driven gear to rotate therewith, a segment member, and means for adjustably interconnecting the segment member and the center member, said center member and segment member each having a partial crylindrical surface, at least one of said partial cylindrical surfaces having axially spaced portions of different arcuate lengths, said interconnecting means positioning the cylindrical surface of the segment member in overlapping relation with a portion of the cylindrical surface of the center member so that said partial cylindrical surfaces coact to form a first and second cylindrical cam surfaces which are axially spaced and have different arcuate lengths, said interconnecting means enabling relative rotation between said members to vary the lengths of both cam surfaces; first and second means for controlling actuation of a valve with each means having cam followers, said first and second means being mounted on the support with their cam followers engaging the first and second cam surfaces as the cam unit is in a service position; a motor mounted on said support; a pinion driven by said motor; means for mounting the pinion at the cut-out segment of the driven gear when the cam unit assumes the service position, said means for mounting enabling yielding of the pinion gear relative to the driven gear to enable mesh engagement therewith as the driven gear is rotated from the service position; and means engageable with the cam unit when in the service position for rotating the cam unit from the service position in response to an initiating signal so that the pinion rotates the cam unit through one revolution to sequentially actuate the first and second switch means to control the valves during the reconditioning operation.

2. A device according to claim 1, wherein said first and second means for controlling are switches each having an actuator with said cam follower, said switches being in an electrical circuit for first and second solenoid actuated valves.

3. A device according to claim 1, wherein said cam unit is mounted on said support with the center member and segment member on one side of the support, said means for adjustably interconnecting the segment member and center member extending through said support to enable a relative rotation of the members from the other side of the support.

4. A device according to claim 3, wherein said segment overlies a portion of the partial cylindrical surface of the center member.

5. A device according to claim 4, wherein said partial cylindrical surface of the center member has the axial spaced portion of different arcuate lengths.

6. A device according to claim 5, wherein said center member has means adjacent one of said axially spaced portions for mounting a segment element to increase the length of one of the cam surfaces.

7. A device according to claim 5, wherein the cam unit includes a segment element having an arcuate surface adjustably mounted on the center member and coacting with a portion of the cylindrical surface of the segment member to form a third cam surface axially spaced from the first and second cam surfaces, third means for controlling a valve having a cam follower and means for mounting the third means on the support with the follower engaging the third cam surface when the cam unit is in the service position.

8. A device according to claim 7, wherein said means for mounting the third means mounts the third means on the first means with the follower aligned with the follower of the first means.

9. A device according to claim 8, wherein said segment member has a circumferential extension aligned with the portion coacting with the segment element to form the third cam surface.

10. A device according to claim 7, wherein the first, second and third means for controlling are switches each having an actuator with the cam follower, said switches being in electrical circuits for three solenoid actuated valves.

11. A device according to claim 7, wherein said means for rotating the cam unit from the service position engages a groove on the cam unit and includes a solenoid mounted on the support and receiving the initiating signal so that the application of initiating signal to the solenoid causes the solenoid to rotate the cam unit from the service position.

12. A device according to claim 11, wherein the treatment apparatus is a watering conditioning apparatus and the reconditioning operation is a regeneration of the conditioning apparatus and which device includes an amplifier for receiving a signal from a sensing probe in the conditioning apparatus and for applying the amplified signal to the solenoid.

13. A device according to claim 11, wherein the center member adjacent the portion forming the second cam surface has means for mounting an additional arcuate segment to extend the length of the second cam surface.

14. A device according to claim 11, wherein said driven gear includes a projection, and wherein said means for rotating the cam unit includes a calendar device mounted on the support and driven by said motor, said calendar device including a trip lever mounted for pivotable movement from a position withdrawn from the path of the projection on the cam gear to a position engaging the projection to rotate the driven gear from the service position independent of actuation of the solenoid.

15. A device according to claim 14, wherein said calendar device includes a day gear having a radial extending projection, means mounting the day gear for rotation on the support, drive means disposed on a support for transferring rotation of the motor to the day gear, a star wheel having a plurality of circumferentially spaced recesses and a shiftable abutment associated with each of the recesses, said abutment each being movable beyween an extended position and a retracted position, said star wheel being mounted on said support adjacent said day gear so that the projections of the day gear engage one recess to rotate the star wheel through a portion of a revolution for each revolution of the day gear and the abutments while in an extended position engage a portion of the trip lever to shift it to a position to engage the projection on the driven gear.

16. A device according to claim 15, wherein the day gear is provided with a dial movable relative to the day gear, said dial and day gear having coacting grooves and projections to maintain the dial in a fixed position relative to the day gear, wherein the means for mounting the day gear comprises a fixed post receiving the dial and the day gear for rotation thereon and means biasing the dial into engagement with the day gear and biasing the day gear into driving relation with the drive means, said biasing means enabling selective disengagement of the dial and day gear to allow setting the time of day and the time for engagement of the radial projection with a recess of the star wheel.

17. A device according to claim 16, wherein the trip lever is provided with a handle to enable pivoting of the lever independent of the calendar device.

18. A device according to claim 3, wherein said means for rotating the cam unit from the service position engages a projection on the driven gear and comprises a calendar device mounted on the support and driven by said motor, said calendar device including a trip lever mounted for pivotable movement from a position withdrawn from the path of the projection on the driven gear to a position engaging the projection and rotating the gear from the service position.

19. A device according to claim 18, wherein said calendar device includes a day gear having a radial extending projection, means mounting the day gear for rotation on the support, drive means disposed on a support for transferring rotation of the motor to the day gear, a star wheel having a plurality of circumferentially spaced recesses and a shiftable abutment associated with each of the recesses, said abutments each being movable between an extended position and a retracted position, said star wheel being mounted on said support adjacent said day gear so that the projections of the day gear engages one recess to rotate the star wheel through a portion of a revolution for each revolution of the day gear and the abutments when in an extended position engage a portion of the trip lever to shift it to a position to engage the projection on the driven gear.

20. A device according to claim 19, wherein the day gear is provided with a dial movable relative to the day gear, said dial and day gear having coacting grooves and projections to maintain the dial in a fixed position relative to the day gear, wherein the means for mounting the day gear comprises a fixed post telescopically receiving the dial and day gear for rotation thereon and means biasing the dial into engagement with the day gear and biasing the day gear into driving engagement with the drive means, so that a time of day and the time for the engagement of the radial projection with a recess of the star wheel can be set by selectively shifting the dial and the day gear axially on the post out of engagement with the day gear and drive means respectively.

21. A device according to claim 20, wherein the trip lever is provided with a handle to enable pivoting of the lever independent of the calendar device.

22. A device according to claim 18, wherein the cam unit includes a segment element having an arcuate surface adjustably mounted on the center member and coacting with a portion of the cylindrical surface of the segment member to form a third cam surface axially spaced from the first and second cam surfaces, third means for controlling a valve having a cam follower, and means for mounting the third means on the support with the follower engaging the third cam surface when the cam unit is in the service position.

23. A device according to claim 22, wherein said means for mounting the third means mounts the third means on the first means with the follower aligned with the follower of the first means and wherein said segment member has a circumferential extension aligned with the portion coacting with the segment element to form the third cam surface.

24. A device according to claim 22, wherein the treatment apparatus is a water conditioning apparatus and the reconditioning operation is a regenerating operation and wherein each of the first, second and third means are switches each having an actuator with the cam follower, said switches being in electrical circuits for controlling first, second and third solenoid actuated valves, respectively, said circuit including a delay relay having a first position opening the circuit to the switches and a second position closing the circuit thereto, wherein the cam unit includes a projection engaging a forth switch means mounted on the support as the cam unit approaches the service position, said forth switch when actuated by the projection applying a signal to the delay relay to shift it to the first position, and wherein the device includes an amplifier for receiving a signal from a sensing probe disposed in the water conditioning apparatus, said amplifier applying a signal from the probe to the delay relay to shift it to the second position so that the first, second and third control means actuate the solenoid valves only after the relay has been shifted to the second position by a sensed signal from the probe and after the calendar device has rotated the cam unit from the service position.

25. A system for controlling the actuation of valves on a first and second water conditioning apparatus to separately regenerate the pair of apparatuses, said system comprising a first and second control device with each of said control devices comprising a support, a compound cam unit mounted on said support for rotation, said cam unit including a driven gear having a cut-out segment in its periphery, a center member attached to the driven gear to rotate therewith, a segment member, and means for adjustably interconnecting the segment member and center member, said center member and segment member each having partial cylindrical surface, at least one of said partial cylindrical surface having axially spaced portions of different arcuate lengths, said interconnecting means positioning the cylindrical surface of the segment member in overlapping relation with a portion of the cylindrical surface of the center member so that the partial cylindrical surfaces coact to form first and second cylindrical cam surfaces which are axially spaced and have different arcuate lengths, said interconnecting means enabling relative rotation between said members to vary the length of both cam surfaces; first and second switch means each having an actuator with a cam follower, each of said switch means being in a circuit for solenoid actuated valves on their respective apparatus, said first and second switch means being mounted on the support with their cam followers engaging the first and second cam surfaces when the cam unit is in a service position; a motor mounted on said support, a pinion driven by said motor, means for mounting the pinion at the cut-out segment of the driven gear when the cam unit assumes a service position, said means for mounting enabling yielding of the pinion gear relative to the driven gear to enable mesh engagement therewith as the driven gear is rotated from the service position; means engageable with the cam unit when in the service position for rotating the cam device from the service position in response to an initiating signal, said means for rotating engaging a groove on the cam unit and including a solenoid mounted in the support and receiving an initiating signal from a sensing probe disposed in the respective apparatus, and said system including interlocking means for preventing operation of one control device during operation of the other control device, said interlocking means interconnecting the first and second control devices so that when one of the cam units is controlling regeneration of its respective conditioning apparatus, the other cam unit is prevented from rotating to regenerate its respective apparatus until the one cam unit returns to the service position.

26. A system according to claim 25, wherein the interlock means includes a delay relay in a power circuit for each of the motors of the first and second control device, each of said delay relays having a first position opening a power circuit to the motor and a second position closing the power circuit, each of said cam units having a projection and a reset switch means mounted on the support and having an actuator with a cam follower engaged by the projection as the cam unit is rotated through one revolution and approaches the service position, and electrical circuitry interconnecting the first and third switches of each device with the delay relay of the other device so that actuation of the first switch means of one of the first and second devices during rotation of the cam unit shifts the delay relay of the other device to the first position to open the circuit of the motor of the other device and actuation of the reset switch as the cam unit approaches the service position on completion of rotation shifts the delay relay of the other device to the second position to close the power circuit of the motor of the other device.

27. A system according to claim 26, wherein each of the cam units includes a segment element having an arcuate surface adjustably mounted on the center member and coacting with a portion of the cylindrical surface of the segment member to form a third cam surface axially spaced from the first and second cam surfaces, third switch means for controlling a third solenoid valve and having an actuator with a cam follower, and means for mounting the third switch means on the support with the follower engaging the third cam surface when the cam unit is in the service position.

* * * * *